(12) United States Patent
Liao

(10) Patent No.: US 7,396,157 B2
(45) Date of Patent: Jul. 8, 2008

(54) BODY TEMPERATURE MEASURING SYSTEM CAPABLE OF MEASURING PLURAL REMOTE TEMPERATURES AND RECEIVER CAPABLE OF MEASURING A BODY TEMPERATURE

(76) Inventor: Chi-Hong Liao, 1F., No. 21, Sec. 1, Xiulang Rd., Yonghe City, Taipei County (TW) 234

(*) Notice: Subject to any disclaimer, the term of this patent is extended or adjusted under 35 U.S.C. 154(b) by 47 days.

(21) Appl. No.: 11/457,688

(22) Filed: Jul. 14, 2006

(65) Prior Publication Data

US 2008/0126004 A1    May 29, 2008

(51) Int. Cl.
- G01K 1/14 (2006.01)
- G01K 13/00 (2006.01)
- G01K 1/02 (2006.01)
- A61B 5/01 (2006.01)

(52) U.S. Cl. ........... 374/141; 374/100; 374/141; 374/163; 374/E1.004; 374/E1.005; 600/300; 600/549; 340/539.1; 340/539.22; 340/539.17; 340/539.15

(58) Field of Classification Search ......... 600/549, 600/300; 374/100, 141, 170, E1.002, E1.004, 374/E1.005; 340/539.1, 539.15, 539.16, 340/539.22

See application file for complete search history.

(56) References Cited

U.S. PATENT DOCUMENTS

| | | | | |
|---|---|---|---|---|
| 3,572,316 A | * | 3/1971 | Vogelman et al. | 600/484 |
| 3,921,621 A | * | 11/1975 | Baessler | 600/549 |
| 4,151,831 A | * | 5/1979 | Lester | 600/549 |
| 4,503,862 A | * | 3/1985 | Baessler | 600/549 |
| 4,686,998 A | * | 8/1987 | Robbins | 600/483 |
| 4,747,413 A | * | 5/1988 | Bloch | 600/549 |
| 5,050,612 A | * | 9/1991 | Matsumura | 600/483 |
| 5,877,675 A | * | 3/1999 | Rebstock et al. | 340/286.07 |
| 5,938,619 A | * | 8/1999 | Dogre Cuevas | 600/549 |
| 6,046,674 A | * | 4/2000 | Irwin et al. | 340/539.28 |

(Continued)

FOREIGN PATENT DOCUMENTS

TW    92211277    1/2005

OTHER PUBLICATIONS

Translation for abstract of TW 92211277, which was published Jan. 21, 2005, please see IDS filed Jul. 17, 2006.

*Primary Examiner*—Edward Lefkowitz
*Assistant Examiner*—Bret Adams
(74) *Attorney, Agent, or Firm*—WPAT, P.C.; Anthony King

(57) ABSTRACT

A temperature measuring device includes a local terminal and a measuring element installed at a predetermined distance from the local terminal. The local terminal includes a first measuring unit for measuring a first human body temperature, a signal processing unit for receiving and converting the first human body temperature, a display unit coupled to the signal processing unit for displaying the converted first human body temperature, and a first interface unit coupled to the signal processing unit. The measuring element includes a second interface unit and a second measuring unit coupled to the second interface unit for measuring a second human body temperature and transmitting the second human body temperature via the second interface unit to the first interface unit, which sends the second human body temperature to the signal processing unit, which converts the second human body temperature and transmits the converted second human body temperature to the display unit, which displays the converted second human body temperature.

15 Claims, 2 Drawing Sheets

U.S. PATENT DOCUMENTS

| | | | |
|---|---|---|---|
| 6,238,354 B1 * | 5/2001 | Alvarez | 600/549 |
| 6,416,471 B1 * | 7/2002 | Kumar et al. | 600/300 |
| 6,547,745 B1 * | 4/2003 | Rubinstein | 600/549 |
| 6,686,843 B2 * | 2/2004 | Felkowitz | 340/573.1 |
| 6,852,085 B2 * | 2/2005 | Rubinstein | 600/549 |
| 7,020,508 B2 * | 3/2006 | Stivoric et al. | 600/390 |
| 2005/0245839 A1 * | 11/2005 | Stivoric et al. | 600/549 |
| 2006/0056487 A1 * | 3/2006 | Kuroda et al. | 374/179 |
| 2006/0161074 A1 * | 7/2006 | Liao | 600/549 |
| 2006/0189852 A1 * | 8/2006 | Greenwald et al. | 600/300 |
| 2007/0027403 A1 * | 2/2007 | Kosted | 600/549 |
| 2007/0143060 A1 * | 6/2007 | Chiu | 702/131 |
| 2007/0239038 A1 * | 10/2007 | Nicolaescu et al. | 600/483 |

* cited by examiner

BODY TEMPERATURE MEASURING SYSTEM CAPABLE OF MEASURING PLURAL REMOTE TEMPERATURES AND RECEIVER CAPABLE OF MEASURING A BODY TEMPERATURE

FIELD OF THE INVENTION

The present invention relates to temperature measuring devices, and more particularly, to a temperature measuring device for measuring body temperature.

BACKGROUND OF THE INVENTION

Mercury thermometers, aural thermometer guns, electronic thermometers, infrared thermometers and thermometer stickers are common body temperature measuring devices found on the current market. These temperature measuring devices measure the variation of examinee's body temperature by a contact or non-contact mechanism, in order to realize whether the examinee's body temperature is falling within a normal range or not.

In the past days, people measured their body temperature only at the times when feeling uncomfortable or having examination and treatment in the hospital, and the temperature measuring devices they used to measure the examinee's body temperature are those mentioned above, such as a mercury thermometer, an aural thermometer gun or an electronic thermometer. It was quite rare to measure examinee's body temperature constantly everyday except people with special need or inpatients. However, nowadays there are some diseases such as severe acute respiratory syndrome (SARS) and bird flu would cause fever when patients catch these epidemic diseases, thus readings of people's body temperature measurement become a strong indication to ensure whether the patient is infected or not.

Therefore, during the peak infection period of SARS and bird flu, government, companies and families all treat the body temperature measuring action as a basic step to prevent these diseases from being spread. It is essential to measure body temperature when entering and leaving the building, the office or sometimes even the factory gate, during that period and companies or parents also take body temperature measurement from their employee or children at least once a day every single day.

Thus those contact or non-contact temperature measuring devices mentioned above can be used to measure the examinee's body temperature. However, those devices all require a particular person to operate and measure the examinees' body temperature one by one, which takes a long time to complete. This not only cause inconvenient in work and life, but also affect the working and manufacturing efficiency.

In order to resolve the temperature measuring devices' drawbacks mentioned on last paragraph, a portable temperature measuring device which can be hanged on the chest is provided. The examinee can record and/or report his present body temperature by carrying a portable temperature measuring device himself. But this portable temperature measuring device works as the examinee records his measurement, then report to the measuring person later afterwards, which means the measuring person can not get the examinee's body temperature measurements instantaneously. If the patient is in a fatal condition, this body temperature measuring method might delay the patient's treatment.

Besides, whichever the temperature measuring devices or the portable temperature measuring device, only measure and record the examinee's body temperature at the particular instance. Therefore, the change of body temperature between two previous measurements can only be estimated by measured data, and the change of body temperature after the last measurement is still unknown. In other words, all the conventional temperature measuring devices mentioned above do not have the function of monitoring the change of body temperature.

Therefore, the inventor of the present invention comes up with a temperature measuring device that can measure examinee's change of body temperature from long distance and this temperature measuring device has applied for Taiwan Patent Examination with case No. 92211277. This temperature measuring device comprises a main body and a measuring element. The measuring element is fitted on the examinee's body to measure the examinee's body temperature and the change of body temperature, and then transmits the measured results to the main body and displays on it. In a hospital, for example, the main body of the temperature measuring device can be placed on a station or carried by the clinic, and the measuring element is placed on the patient. By using the measuring unit on the measuring element to measure the examinee's body temperature, and then transmits the measured result to the main body via the second interface unit on the measuring element to allow the clinic monitoring the patient's real-time body temperature and change of body temperature.

Yet the main body of the above temperature measuring device itself cannot measure body temperature, which means while the clinic is monitoring the remote patient's body temperature by the temperature measuring device, the clinic cannot measure others body temperature by the main body they are carrying. Therefore, although the clinic can visit the ward areas examining patients' condition and can monitor the remote patient's body temperature and change of body temperature simultaneously by carrying the main body of the temperature measuring device, they still have to carry another body temperature measuring device in case the patient's body temperature they are visiting needs to be measured. Thus and so, preparing an extra measuring device not only inconveniences the clinic, but also is not economical for the hospital due to increasing the financial load.

Therefore, to provide a temperature measuring device, which is able to measure and monitor the examinee's body temperature simultaneously, to resolve the drawbacks from the conventional temperature measuring device such as spending long time on taking measurements and not able to monitor the examinee's change of real-time body temperature, is quite meaningful.

SUMMARY OF THE INVENTION

In light of the above drawbacks of the prior art, an objective of the present invention is to provide a real-time temperature measuring device for measuring the change of an examinee's body temperature.

Another objective of the present invention is to provide a cost-effective temperature measuring device.

In accordance with the above and other objectives, the present invention purposes a temperature measuring device, which includes a main body and a measuring element installed at a predetermined distance from the main body. The main body includes a first measuring unit for measuring a first body temperature, a signal processing unit coupled to the first measuring unit for receiving and converting the first body temperature, a display unit coupled to the signal processing unit for displaying the converted first body temperature, and a first interface unit coupled to the signal processing unit. The measuring element includes a second interface unit and a second measuring unit coupled to the second interface unit for measuring a second body temperature and transmitting the second body temperature via the second interface unit to the first interface unit, which sends the second body temperature to the signal processing unit, which converts the second body temperature and transmits the converted second body temperature to the display unit, which displays the converted second body temperature.

One of a plurality of features of the present invention is that both the main body and the measuring element are capable of measuring the examinee's body temperature. Thus, the display unit can display the body temperatures measured by the main body and the measuring element at a remote terminal and/or a local terminal. Therefore, the drawbacks of the prior art that the main body is not able to measure others body temperature while monitoring the examinee's real-time body temperature has been resolved.

Moreover, the present invention provides a temperature measuring device that has a main body capable of receiving measurements from the measuring element and also measuring the temperature by itself. This combination makes the present invented temperature measuring device more cost effective comparing to the prior art.

DETAILED DESCRIPTION OF THE PREFERRED EMBODIMENTS

First Preferred Embodiment

Figure 1:
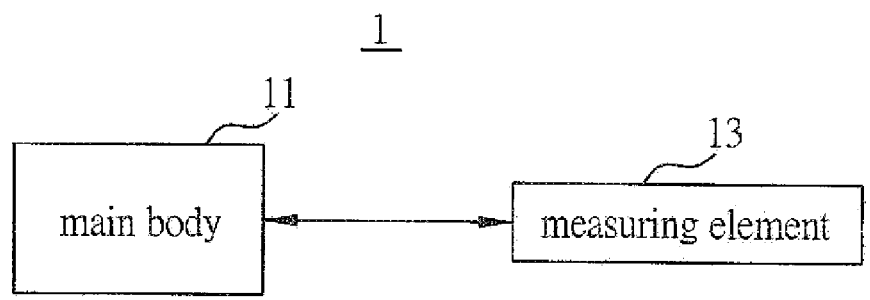
FIG. 1 is a block diagram of a temperature measuring device of a first embodiment according to the present invention.
Figure 2:
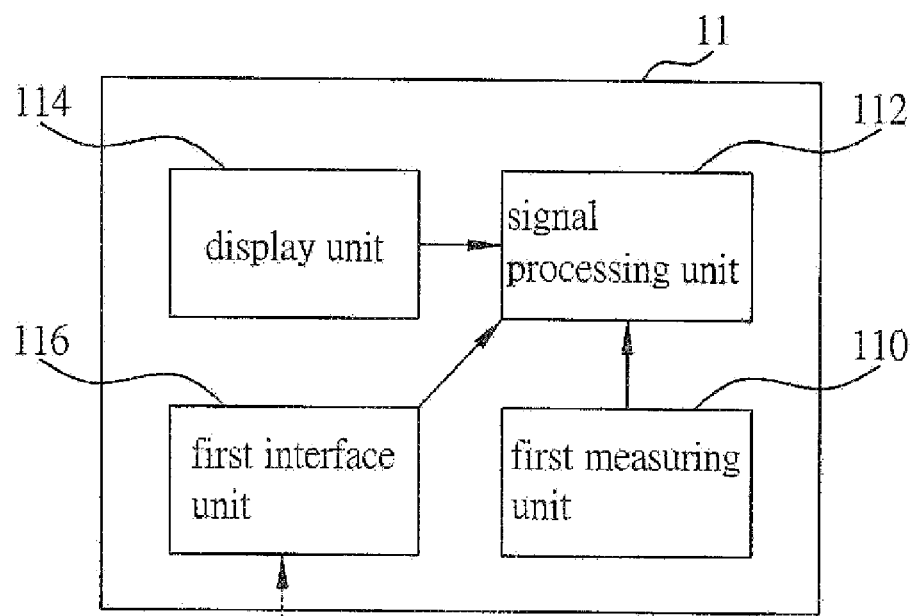
FIG. 2 is a block diagram of a main body of the temperature device shown in FIG. 1.
Figure 3:
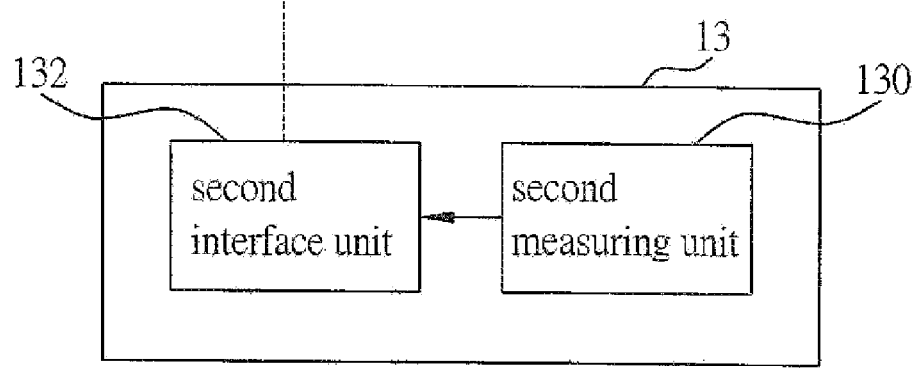
FIG. 3 is a block diagram of a measuring element of the temperature measuring device shown in FIG. 1.

FIGS. 1, 2 and 3 are three block diagrams of a first embodiment according to the present invention, therein the icons are all simplified representations and only represents the units relating to the present invention. The actual size and shape of the units in reality can be varied and is not the especial feature of the present invention, therefore the detailed size and shape of the units will not be described here.

FIG. 1 is a block diagram of a temperature measuring device 1 of a first embodiment according to the present invention. The temperature measuring device 1 comprises a main body 11 and a measuring element 13. The measuring element 13 is installed at a predetermined distance from the main body 11.

FIG. 2 is a block diagram of the main body 11. The main body 11 comprises a first measuring unit 110, a signal processing unit 112, a display unit 114 and a first interface unit 116. The first measuring unit 110 is used for measuring an examinee's body temperature and sending a measuring result to the signal processing unit 112 for conversion. The signal processing unit 112 converts the measured result and sends the converted measured result to the display unit 114 for display.

According to the first embodiment, the first measuring unit 110 is designed as a contact thermometer and fabricated by a material that can measure temperature. The first measuring unit 110 contacts with an examinee's body in order to obtain the examinee's body temperature during a measuring process. According to another embodiment, the first measuring unit 110 is designed as a non-contact thermometer, such as an infrared measurement, and fabricated by an automated temperature measuring chip under this circumstance, in order to measure the examinee's body temperature automatically. Videlicet, it can be understood by those skilled in the art, that within the scope of the present invention, other alternative selection of contact and non-contact thermometer can all be fitted as the first measuring unit 110 of the present invention, and not limited to the two examples above.

According to the first embodiment, the signal processing unit 112 is a micro processing chip, which converts the measured results coming from the first measuring unit 110 or the measuring element 13. Because the signal processing unit 112 such as the micro processing chip belongs to conventional technologies and Taiwan Patent no. 58599 has already disclosed the related technology, further explanation are hereby omitted.

The display unit 114 displays the measured results converted by the signal processing unit 112. According to the first embodiment, the display unit is a monitor, which displays the measured results of body temperature in forms of a number (such as 36 degrees, which is an initial temperature or a re-measured temperature and will be described later in details), a graph (such as a temperature curve) and other appropriate display methods. It is to be understood that in the present embodiment, the display unit 114, which is used for displaying the measured results of body temperature, is not only limited at this function only. The display unit 114 can also display the period of the measuring time or other measurements, the highest or the lowest measured body temperature. In addition, the display unit 114 itself is not limited to one monitor only and can be setup as more than two monitors in order to display the measured result output from the main body 11 and the measuring element 13 simultaneously or display other information or status. Moreover, the display unit 114 can also display an battery status of the main body 11, and the electricity that supplies the main body 11 can be any conventional electricity source (such as battery).

The first interface unit 116 is a connecting interface for wirelessly exchanging signals between the main body 11 and the measuring element 13. The first interface unit 116 receives signals transmitted from the measuring unit 13 and transfers the received signals to the signal processing unit 112 for conversion. The signal processing unit 112, after converting the received signals, sends the converted measured results to the display unit 114 for display. The first interface unit 116 is an interface under Bluetooth or infrared transmission standard or other equivalent wireless data transmission interface standards, but not limited to these.

The main body 11 further comprises a gauge unit (not shown) for determining whether the converted measured result is within a preset temperature range (for instance a temperature range between 36 to 38 degree Celsius). The gauge unit issues an indication signal only when determining that the measured result is not within the temperature range. According to the first embodiment, the gauge unit is linked to an external indication unit, such as an indication lamp, a buzzer, a vibrator and other equivalent elements, for operating in response to the indicating signal, which is issued by the gauge unit when determining that the measured result is not within the temperature range. The gauge unit can also be a combination of the above devices, for blinking, making buzz sounds and/or vibrating when body temperature is not within the temperature range. Furthermore, the gauge unit can be used to determine the battery status of the main body 11, and sends a determining result to the display unit 114 for display.

According to the previous description, the main body 11 itself can be used as a thermometer. When the main body 11 measures the examinee's body temperature, the first measuring unit 110 can be either a contact or non-contact thermometer, and the gauge unit can determine the measured result to see if the measured result is within the preset temperature range. If the measured result is not within the temperature range, the gauge unit issues the indication signal. The main body 11 has a temperature index switching function for transforming a Celsius (° C.) temperature to a Fahrenheit (° F.) temperature and vice versa, for the convenience of the users in different areas. The theory for the switching of the temperature units belongs to conventional technology, further explanation hereby omitted.

FIG. 3 is a block diagram of the measuring element 13. The measuring element 13 comprises a second measuring unit 130 and a second interface unit 132. The second measuring unit 130 measures the examinee's body temperature and transmits the measured result to the first interface unit 116 of the main body 11 via the second interface unit 132. The measured result will be converted by the signal processing unit 112 and the converted result will be send to the display unit 114 for display.

According to the first embodiment, the second measuring unit 130 is fabricated by materials or elements that can measure temperature, or is fabricated with an automated temperature measuring chip. Besides, the measuring element 13 can be made of soft materials for sticking to the examinee's body, such as head, arms, neck or other parts of the body, in order to measure the examinee's body temperature directly. Furthermore, the measuring element 13 can be fixed to the examinee's body by a removable fixing unit (not shown), such as a ventilative tape, an elastic bandage, an adhesive bandage, a belt or other elements that can be stuck to the body repetitively. Certainly, the way to combine the second measuring unit 130 and the second interface unit 132 is not limited and it can be in various combination methods according to the different application in real life, as long as the function of measuring and transmitting can be achieved.

In other words, the measuring element 13 can have a configuration to be stuck to the examinee's body directly, or be fixed to the examinee's body by a removable fixing unit mentioned above. In the first preferred embodiment, the second measuring unit 130 is a contact thermometer. Therefore, no matter how the measuring element 13 is fixed to the examinee's body, as long as the second measuring unit is contacting with the examinee's body, the measuring element 13 can measure the examinee's body temperature. The measuring element 13 can also be a non-contact thermometer such as an infrared thermometer for measuring the body temperature. Under this circumstance, it is not necessary to put the measuring element 13 and the second measuring unit 130 in contact with the examinee's body. The measuring element 13 can be placed under the examinee's jacket. In other words, the purpose of the measuring element 13 and the second measuring unit 130 is to measure the examinee's body temperature and transmit the measured result to the main body 11; the figure of the combination can be changed and modified according to the real life application and not limited to the combination figure in this embodiment.

In the first embodiment, the measuring element 13 contacts to the examinee's head, arms or neck. However, the measuring element 13 can contact or be placed on any other suitable parts of the examinee's body as long as body temperature is measured correctly, therefore the areas are not limited to the head, arms or neck used in the first embodiment.

The second interface unit 132 is used for transmitting the measured result obtained by the measuring element 13 to the main body 11 via the first interface unit 116. According to the first embodiment, the second interface unit 132 is selected to be an interface corresponding to the first interface unit 116 and is not limited to the first embodiment, as long as the first interface unit 116 and the second interface unit 132 can transmit corresponding to each other.

When the temperature measuring device 1 of the present invention is in use, the temperature measuring unit 13 and the main body 11 measure the body temperature individually. For example, the main body 11 can be installed as a local terminal, while the measuring element 13 can be installed on the examinee's body as a remote terminal. The second interface unit 132 sends the measured result to the main body 11 for process and display. When installed on the examinee's body, the measuring element 13 measures the examinee's body temperature and gets an initial temperature parameter instantly; After a period of time, for example 90 seconds, the measuring unit 13 updates the temperature parameter or records a next new measured temperature parameter. The period of time between two consecutive measurement processes is not limited to 90 seconds, and therefore can also run consecutive measurements or make a change and modification according to the reality needs. When the main body 11 is used for measuring the examinee's body temperature independently, the main body 11 can also record the examinee's body temperature parameter from the first measuring unit 110 as a reference for a next measurement. Please note that the remote and local terminals in the first embodiment represent the relative location of the measuring element and the main body 11 works independently, and it is necessary to say that the measuring element must be the remote terminal and the main body must be the local terminal.

For example, the clinic can measure the patient's body temperature by using the main body 11 during daytime, and fit the measuring element 13 to the patient's body during nighttime. By placing the main body 11 at a place where is easy for the clinic to watch or carry the main body 11 with the clinic while visiting the ward area, thus the clinic can monitor the patient's change of temperature and not delay any other work. Moreover, no matter using the main body 11 or the measuring element 13 to measure the patient's body temperature, the warning beep will be triggered to alert the clinic if the measured result not falling within the default temperature range. This method reduces the contact frequency between the clinic and the patient to give more protection to the clinic's health, but still allows the clinic to monitor the patient's change of body temperature clearly and instantly.

Second Preferred Embodiment

Figure 4:
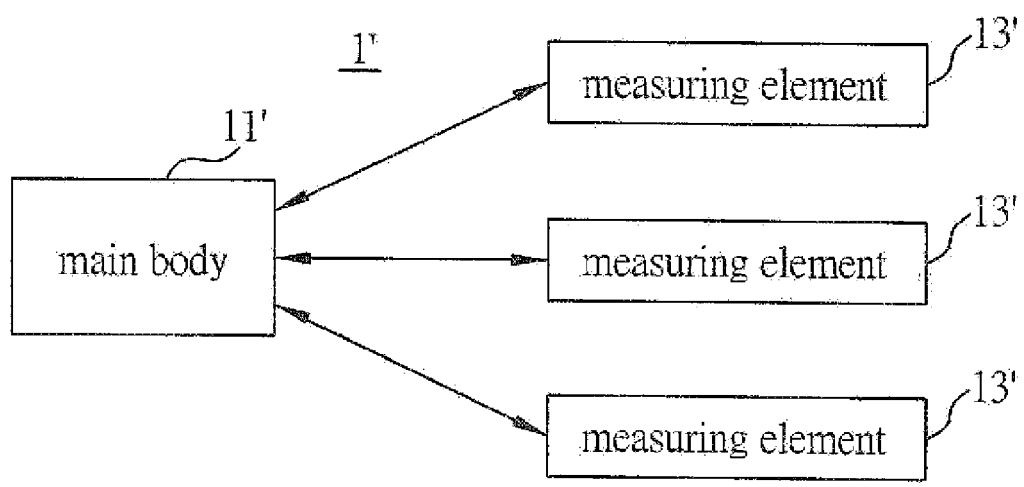
FIG. 4 is a block diagram of a temperature measuring device of a second embodiment according to the present invention.

FIG. 4 is a block diagram of a temperature measuring device 1' of a second embodiment according to the present invention. The temperature measuring device 1' comprises a main body 11' and a plurality of measuring elements 13'. The temperature measuring device 1' has functions the same as those of the temperature measuring device 1 of the first embodiment. Therefore, only demonstrate the difference in configuration and usage here, to help to understand the characteristic and the advantage of the prevent invention.

A difference between the second embodiment and the first embodiment is that the temperature measuring device 1' has more than one measuring element 13', which can be installed on different examinees and use one main body 11' to measure and monitor the examinees' real-time body temperatures remotely; the main body 11' itself can be used as a temperature measuring tool like forehead thermometer gun or aural thermometer gun.

When applying the second embodiment to a place, such as the nursing home, the factory or the hospital, where monitoring the examinee's temperature is required; plural measuring elements 13' can be fitted to plural people and the main body 11' is setup at a place where the clinic and the manager is convenient to watch or carried by the clinic or the manager. Each measuring element 13' instantly transmits each examinee's body temperature and its temperature change to the main body 11', and also alerts the clinic if any of the examinee's temperature exceeds the default upper and lower limit. Therefore, not only the manager and the clinic can obtain and monitor the examinees' real-time body temperature in plurality from the main body 11', but also can use the main body 11 'to measure any other examinee' body temperature.

Moreover, the main body 11' can be also setup in plurality, for example, setup two or more main bodies 11' in order to allow the manager and the clinic to monitor plural examinees' change of body temperature in different location; or to allow different team of the manager and the clinic to monitor the examinees' change of body temperature, which provides with numerous to numerous body temperature monitoring. To conclude the aforementioned, the measuring element of the temperature measuring device of the present invention can be fitted onto single or plural examinee flexibly, in order to obtain the examinee's change of body temperature instantly; then transmits the measured result to the signal processing unit of the main body to convert and display on the display unit. Besides the measuring element can measure the examinee's body temperature and display the measurement through the main body, the main body itself can measure the examinee's body temperature also. Therefore in the real life application, the temperature measuring device of the present invention not only fulfills the need of monitoring the remote terminal real-time, but also allows the main body to measure the examinee's body temperature directly anytime. Moreover, using the present invention of the temperature measuring device's remote and local control can save the extra spending on the measuring tool such as forehead thermometer gun or aural thermometer gun.

In the two aforementioned examples of the preferred embodiments, it is mainly described as an application in the clinic environment. But in real life application, the present invention can be widely applied to many places, such as plant buildings in the factory or hospital buildings, where body temperature measuring process is required; and also in the real life application, a signal enhancer or other appropriate signal boosting element or device can be used, when the main body and the measuring element has distanced far, to ensure the signal transmitted correctly during long distance monitoring.

The invention has been described using exemplary preferred embodiments. However, it is to be understood that the scope of the present invention is not limited to the disclosed embodiments. On the contrary, it is intended to cover various modifications and similar changes. The scope of the claims, therefore, should be accorded the broadest interpretation so as to encompass all such modifications and similar arrangements.

What is claimed is:

1. A temperature measuring device for measuring temperature of human body, comprising:

a main body comprising a first measuring unit as a local terminal for measuring a first temperature value of a first human body and sending the first temperature value, a signal processing unit coupled to the first measuring unit for receiving and converting the first temperature value, a display unit coupled to the signal processing unit for displaying the converted first temperature value, and a first interface unit coupled to the signal processing unit; and a measuring element capable of being attached on a human body and is separated from the main body, and said measuring element acting as a remote terminal comprising a second interface unit and a second measuring unit coupled to the second interface unit for measuring a second temperature value of a second human body and sending the second temperature value and transmitting the second temperature value via the second interface unit to the first interface unit, wherein the second temperature value is sent to the signal processing unit by the first interface unit, the second temperature value is converted by the signal processing unit, and the converted second temperature value is transmitted to the display unit by the signal processing unit for being displayed.

2. The temperature measuring device of claim 1, wherein the main body comprises a gauge unit for determining whether the converted first or second temperature value is within a preset temperature range, and issuing an indication signal when determining at least one of the converted first or second value is not within the preset temperature range.

3. The temperature measuring device of claim 2, wherein the gauge unit comprises an indication lamp.

4. The temperature measuring device of claim 2, wherein the gauge unit comprises a buzzer.

5. The temperature measuring device of claim 2, wherein the gauge unit is connected to an external indication unit for issuing the indication signal.

6. The temperature measuring device of claim 5, wherein the external indication unit is one selected from a group consisting of an indication lamp, a buzzer, and a vibrator.

7. The temperature measuring device of claim 1, wherein the display unit comprises a monitor.

8. The temperature measuring device of claim 1, wherein the first interface unit is a wireless data transmission interface.

9. The temperature measuring device of claim 1, wherein the signal processing unit is a micro processing chip.

10. The temperature measuring device of claim 1, wherein the first measuring unit has a structure made of a temperature measurable material.

11. The temperature measuring device of claim 1, wherein the first measuring unit is an automatically temperature measuring chip.

12. The temperature measuring device of claim 1 further comprising a fixing unit for fixing the measuring element.

13. The temperature measuring device of claim 12, wherein the fixing unit is one selected from a group consisting of a ventilative tape, an elastic bandage, an adhesive bandage and a belt.

14. The temperature measuring device of claim 1, wherein the second measuring unit has a structure made of a temperature measurable material.

15. The temperature measuring device of claim 1, wherein the second measuring unit is an automatically temperature measuring chip.

* * * * *